United States Patent [19]

Howell et al.

[11] Patent Number: 4,821,216

[45] Date of Patent: Apr. 11, 1989

[54] MULTIFUNCTION METER FOR USE IN AN AIRCRAFT

[75] Inventors: John S. Howell; Robert L. Hartung, both of Fort Worth, Tex.

[73] Assignee: Howell Instruments, Inc., Fort Worth, Tex.

[21] Appl. No.: 36,902

[22] Filed: Apr. 10, 1987

[51] Int. Cl.[4] .................. G08B 21/00; G01C 23/00
[52] U.S. Cl. .................. 364/551.01; 324/115;
340/945; 340/973; 364/557; 364/508
[58] Field of Search .............. 364/550, 551, 557, 424,
364/556, 508; 340/971, 963, 973, 52 R, 945;
324/990, 115

[56] References Cited

U.S. PATENT DOCUMENTS

| | | | |
|---|---|---|---|
| 3,237,448 | 3/1960 | Howell | 364/557 |
| 3,250,901 | 5/1966 | Brahm | 364/557 |
| 3,584,507 | 6/1971 | Hobenberg | 364/551 |
| 3,593,012 | 7/1971 | Lang | 364/551 |
| 3,906,437 | 9/1975 | Brandwein et al. | 340/945 |
| 3,946,364 | 3/1976 | Codomo | 364/900 |
| 4,114,442 | 9/1978 | Pratt | 364/557 |
| 4,122,720 | 10/1978 | Podl | 364/557 |
| 4,135,246 | 1/1979 | McMannis | 364/551 |
| 4,144,573 | 3/1979 | Trussell | 364/551 |
| 4,215,412 | 7/1980 | Bernier | 364/551 |
| 4,317,106 | 2/1982 | Huber | 364/424 |
| 4,372,692 | 2/1983 | Thomae | 364/557 |
| 4,443,117 | 4/1984 | Muromoto | 364/557 |
| 4,480,312 | 10/1984 | Wingate | 364/557 |
| 4,549,504 | 10/1985 | Gaines | 364/557 |
| 4,551,801 | 11/1985 | Sokol | 364/551 |
| 4,562,554 | 12/1985 | Stixrud | 364/557 |
| 4,575,803 | 3/1986 | Moore | 364/557 |
| 4,635,030 | 1/1987 | Rauch | 340/973 |
| 4,707,796 | 11/1987 | Calabro et al. | 364/551 |
| 4,733,361 | 3/1988 | Krieser et al. | 340/945 |

OTHER PUBLICATIONS

3rd Digital Avionics Conf (IEEE), Nov. 6-8, 1979, "Electronic Flight System for B767/757"; A. J. Dandekar; pp. 180-186.

Canadian Elect. Engineering, Mar. 1979 (V23, N3); "Aircraft Flat Panel Displays . . ."; pp. 18-20.

Primary Examiner—Parshotam S. Lall
Assistant Examiner—Kevin J. Teska
Attorney, Agent, or Firm—Cushman, Darby & Cushman

[57] ABSTRACT

An indicator monitor which performs a plurality of functions. Both engine exhaust gas temperature and engine rpm are monitored. Based on the engine rpm, it is determined whether the engine is in starting or operating condition. Different parameters and different values are used based on this indication. A plurality of different functions including parameters indicative of temperature in rpm can be monitored by this one meter with a single display and which has electronics that can be housed in an area smaller than the display face.

43 Claims, 8 Drawing Sheets

MULTIFUNCTION METER FOR USE IN AN AIRCRAFT

FIELD OF THE INVENTION

This invention relates to a multifunction meter specially adapted for use in an aircraft. More specifically, this meter can display a plurality of different conditions to the user, yet takes up the space of only one instrument in an aircraft instrument panel.

BACKGROUND OF THE INVENTION

The many systems and parameters which must be monitored during the flight of an aircraft, require a cockpit to be crowded. Some of the most important indicators are located in the cockpit on the instrument panel located where a pilot can easily view the indicators on a continuous base. Each instrument typically monitors one information value. These many indicators are necessary in order to allow monitoring, by a pilot, of the various engine parameters and the environment of the aircraft. However, the large number of such indicators necessitates a very large instrument panel, making the cockpit area confusing and hard to wire.

U.S. Pat. No. 4,575,803 teaches a microprocessor controlled, single display engine monitor and recorder which generates excessive temperature alarms, stores the length of time over predetermined temperatures, and indicates total engine hours. U.S. Pat. No. 3,593,012 teaches an engine life recorder system which generates excessive temperature alarms, excessive speed alarms, and also integrates the speed and temperature signals to generate an engine life cycle value. This recorder system also displays total engine running time. However, according to this patent, each of these displays requires a separate display face. U.S. Pat. 3,250,901 also teaches integration of temperature and engine rotation speed characteristics.

However, all of these patents are relatively disadvantageous because they only display a relatively small number of different functions. Furthermore, since each instrument typically receives only a single input parameter, monitoring of peaks, limits, and percents of temperature can only be roughly estimated. This is because different reference levels are applicable for different operating conditions of the aircraft engine. For instance, when an engine first starts up, it will be normal for the engine to operate hotter than it will operate during normal operation. Therefore, an over-temperature alarm should occur at a different level during starting than it should occur during operating of the engine. Similarly, if total time above a danger temperature is to be recorded, this danger level should be changed based on whether the engine is starting or operating.

According to the present invention, this is advantageously effected by monitoring parameters related to both rotational speed and temperature of the aircraft engine. The rotational speed can be detected to determine if the engine is in start or operate condition. The temperature can then be compared with a threshold that varies based on whether the engine is starting or operating.

None of the prior art has an indicator with a single display that displays values relating to both temperature and rotational speed of the aircraft engine. U.S. Pat. Nos. 3,250,901 and 3,593,012 do monitor both rotational speed and temperature in the same indicator assembly. However, '901 only displays engine life cycle, and '012 displays different parameters on different monitors. Since different monitors are used, extra space on the indicator array is necessary. Furthermore, neither of these patents teach using the rotational speed to determine a starting or operation state, and to choose a reference, based on rotational speed, with which temperature will be compared.

Furthermore, none of these meters enables a plurality of functions as complex as those according to this invention, to be monitored using a single meter. These plurality of functions as monitored by the present invention include peak temperature, length of time over a predetermined temperature, excessive temperature, peaks over a temperature limit for both engine starting and operation modes, peak speed, length of time over a predetermined speed, total engine hours, and engine life cycle. Furthermore, none of these patents enable all the associated circuitry to be in a container having a cross sectional area smaller than the area of the display itself.

SUMMARY OF THE INVENTION

To overcome all of the above discussed problems, the present invention defines an indicator for an aircraft which has a number of distinct advantages. According to one aspect of this invention, temperature alarm limits can be set, and peaks can be monitored during conditions of engine starting and operation conditions. This ability to determine between engine starting and continuous operation is determined by the engine rotational speed.

The indicator according to the present invention can monitor peak temperature thresholds; monitor time for overtemperature, monitor excessive temperature alarms; set temperature limits and monitor peaks for both engine starting and continuous operating conditions, peak speed monitor; time over speed thresholds; monitor total engine hours; and monitor engine life cycle. All of these functions can be stored and displayed on a single display. All of the electronics necessary to drive the display can also be embodied in a very small container. Therefore, this multi-function indicator can be mounted on the instrument panel on an aircraft cockpit in the space typically occupied by a standard display.

The indicator of the present invention obtains many of its advantages due to monitoring functions of both temperature and revolution rate of the engine. Monitoring revolution rate of the engine enables a determination of whether the engine is in starting or operating mode. In starting mode, it is likely that the temperature of the engine will be higher than it will in operating mode. Therefore, based on the decision of whether the engine is in starting mode or operating mode, different temperature relations are calculated and displayed. Other aspects and advantages of the present invention will be discussed in detail herein.

BRIEF DESCRIPTION OF THE DRAWING

An exemplary and presently preferred embodiment of the invention will be described in detail with reference to the accompanying drawings, wherein.

DESCRIPTION OF THE PREFERRED EMBODIMENT

Figure 1A:
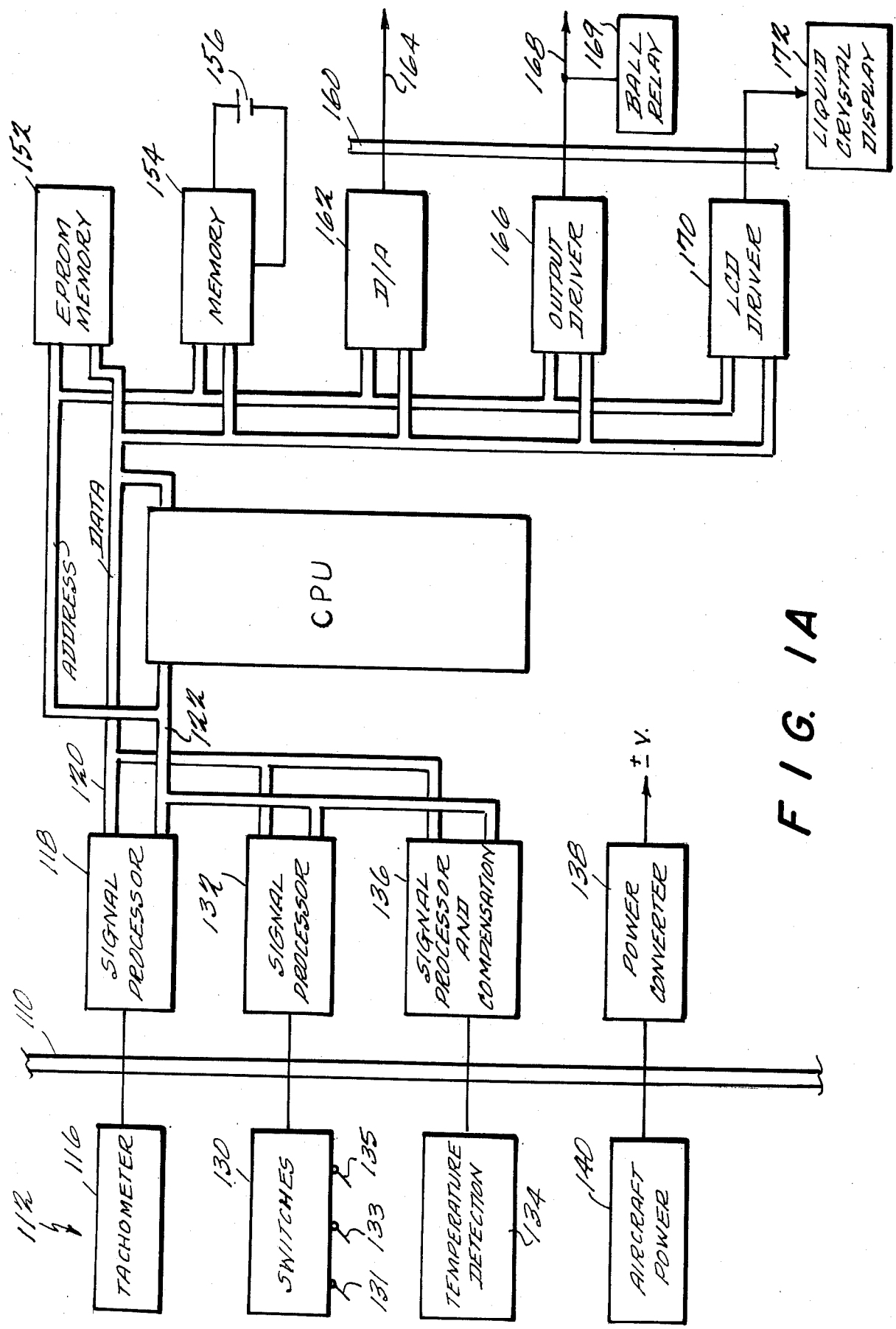
FIG. 1A shows a block diagram of the structure used according to the present invention.

FIG. 1A shows a block diagram of the structure used according to the present invention to obtain the metering function. A connector 110 is provided to connect aircraft systems 112 to the monitoring system 114. Tachometer 116 generates pulses related to the revolution rate of the engine. Tachometer 116 is connected to signal processor 118, which processes the pulses from tachometer 116 to generate a signal indicating engine rotational speed. An output signal from signal processor 118 is selectively coupled to a data bus 120. An address bus 122 is also coupled to signal processor 118.

A plurality of external switches 130 are connected through connector 110 to signal processor 132. Signal processor 132 is also connected to both data and address buses 120 and 122, and processes the switch inputs so that they can be utilized by the indicator.

Temperature detector 134 is located in the aircraft, and detects a temperature of a location thereof. According to this embodiment, the temperature detector structure 134 detects exhaust gas temperature, or EGT, and includes a thermocouple located to detect this temperature. Signal processor and compensation circuit 136 receives the input from the thermocouple, compensates for the junction temperature of the thermocouple in known and conventional ways, and processes the signal to be input onto data bus 120.

Power converter 138 is coupled to the source of aircraft power 140. Power converter 138 produces a plurality of different supply voltages for use by the different structures of assembly 114.

The data and address buses are coupled to CPU 150 which coordinates the operation of the entire assembly. CPU 150 is also associated with an EPROM memory 152 which includes the program for operation of CPU 150. Scratch pad memory and the like is provided by memory 154, which, in this embodiment, is backed up by battery 156. Of course, this could also be accomplished using a nonvolatile memory.

The output signals from assembly 114 are provided through connector 160. A digital-to-analog converter 162 produces an analog output signal 164, appropriately selected by programming CPU 150, which is adapted to be coupled to an external device. Some possible uses of this analog output include driving an additional meter, driving a warning light or providing temperature and/or engine speed data to other equipment.

Output driver 166 is also provided, which produces an output signal 168. This output signal can also be used to drive a warning device, such as ball relay 169 or to connect to an aircraft system alarm.

LCD driver 170 drives liquid crystal display 172. This relatively simple structure therefore enables a plurality of values to be monitored and displayed as will be further defined herein.

According to the best mode of the present invention, the CPU used is of the type NSC-800. The signal processors 118, 132, and 136 include structures such as A to D converters, operational amplifiers, latches and tri-state buffers. Those of ordinary skill in the art would certainly understand how to embody the different blocks of this diagram based on the information herein.

Figure 2:
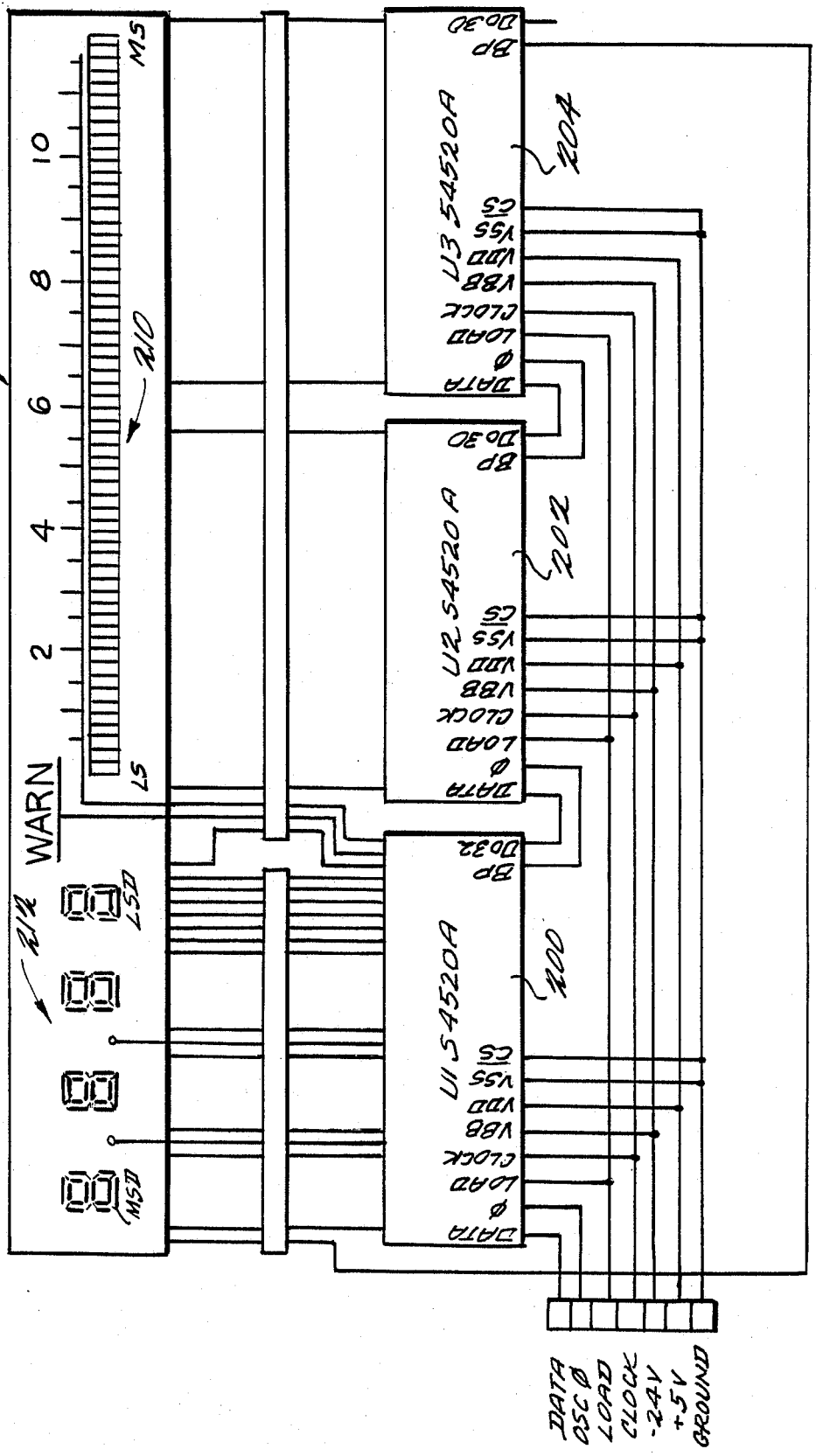
FIG. 2 shows a block diagram representation of the liquid crystal display driver structure.

The detailed structure of LCD driver 170 is shown in FIG. 2, as driving the liquid crystal display. This structure uses three integrated circuit chips, 200, 202 and 204 to drive display 172. Display 172 includes an analog scale and a four unit digital display to indicate a value, as well as a "warning" indicator that can be selectively lit. Integrated circuits 200, 202, and 204 are of the type S4520A, made, for example, by AMI Company.

In operation, a plurality of switches in switch element 130 are provided. These switches include read switch 131, reset switch 133 and calibration step switch 135. Since the display displays a plurality of different functions, read switch 131 is used to cycle between these different functions.

Figure 3A:
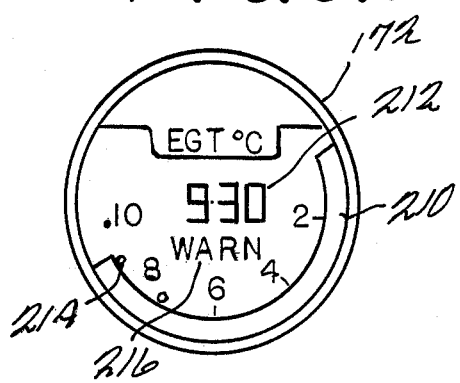
FIGS. 3A through 3F show representative display faces of the meter used according to the present invention.

FIGS. 3A through 3G show examples of different display faces which are generated according to this embodiment by depression of read switch 131. FIG. 3A, for example, shows some of the various elements displayed on the face of display 172. According to FIG. 3A, analog temperature display 210 and digital temperature display 212 both show 930°. The warning level indicator 214 is set at approximately this level. Warning level indicator 214 is shown with the temperature approaching the warning level, so that warning indicator 216 is on.

Figure 1B:
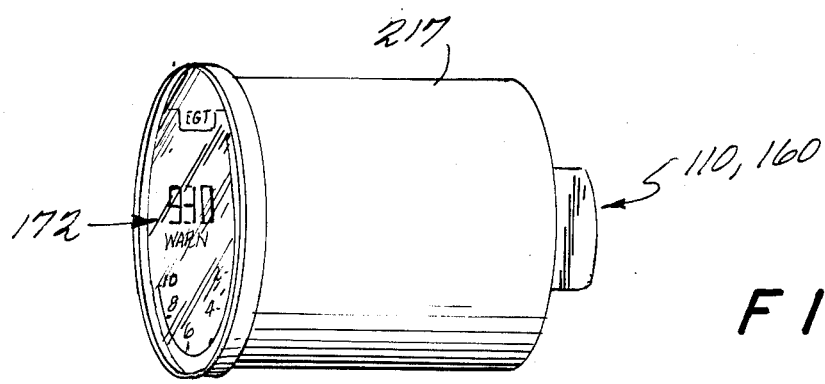
FIG. 1B shows a schematic perspective of the indicator of the present invention.

As can be seen in FIG. 1B, chassis housing 217 is attached to display 172. All of monitoring system 114 is contained within chassis housing 217. Note that the cross-sectional area of chassis housing 217 is smaller than the area of display 172 so that housing 217 fits entirely behind display 172.

Figure 3B:
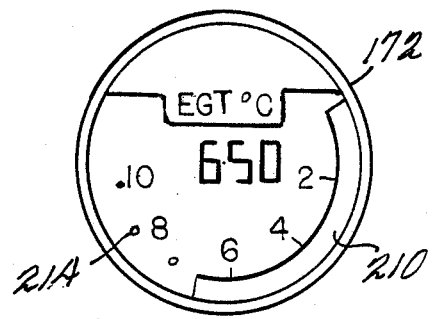

FIG. 3B shows the same display at 650° Again, warning level indication 214 is set, but the temperature is well below this level so that warning indicator 216 is not on.

Figure 3C:
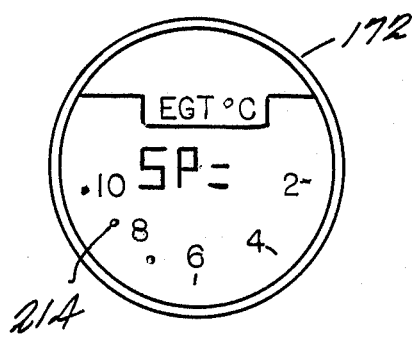
Figure 3D:
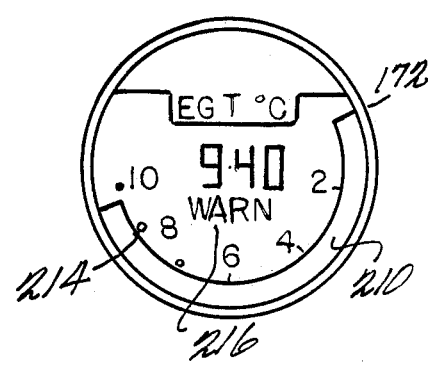

FIGS. 3C and 3D show one of the monitor modes of this display. While the display will typically be in the modes shown in FIGS. 3A and 3B—that is, the temperature indicator mode—, this normal mode can be exited and monitor mode entered by pressing read switch 131. Once in monitor mode, stepping between different parameter displays is possible by repeatedly pressing read switch 131. The display alternates, within any parameter display mode, from the parameter mnemonic to the parameter, to alternately indicate which monitor mode is being indicated, and the value of the indicated parameter.

FIG. 3C shows start temperature peak mode which has a mnemonic of SP=. The start temperature peak value, shown in FIG. 3D is 940°.

Figure 3E:
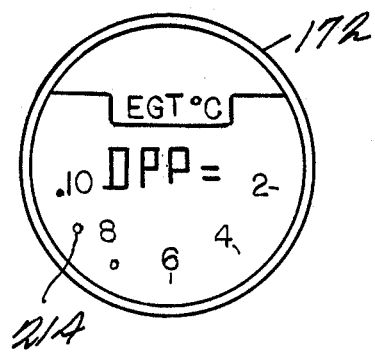
Figure 3F:
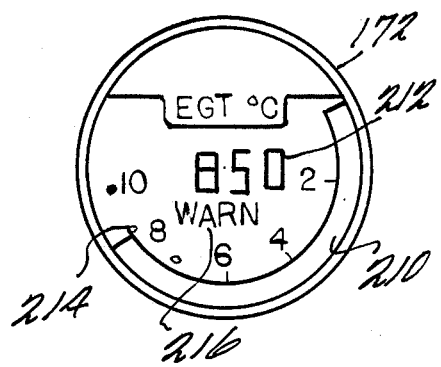

Operating temperature peak or OP.P= is shown in FIG. 3E, with the value of 850° shown in FIG. 3F. Other possible information values displayed according to this embodiment are:

Time above a certain temperature threshold.
Engine speed peak (ES.P=).
Time above 101% of the red line rpm of the engine (101=).
Engine operating hours with rpm greater than 48% of red line rpm (OP.H=).
Engine cycles (LCF=).

This plurality of advantageous operations is available because of the single monitor structure monitoring functions of both temperature and rpm. By monitoring rpm, a determination can be made as to an operating state of the engine—whether the engine is starting or operating. By assuming that rpm below a certain value includes a starting condition of the engine, the conditions necessary to establish a warning condition are changed, based on whether the engine is starting or in normal operating mode. According to a preferred embodiment of the present invention, the engine is considered to be in a starting mode when engine rpm is less than 48% of the red line. A temperature relation can be more advantageously calculated in this way. For instance, a 888° centigrade warning threshold is established during the starting operation. When rpm is greater than or equal to 48% of red line, the warning temperature threshold is set at 827° centigrade. An activated segment on analog temperature display 210 will blink when the temperature is exceeded.

Figure 4:
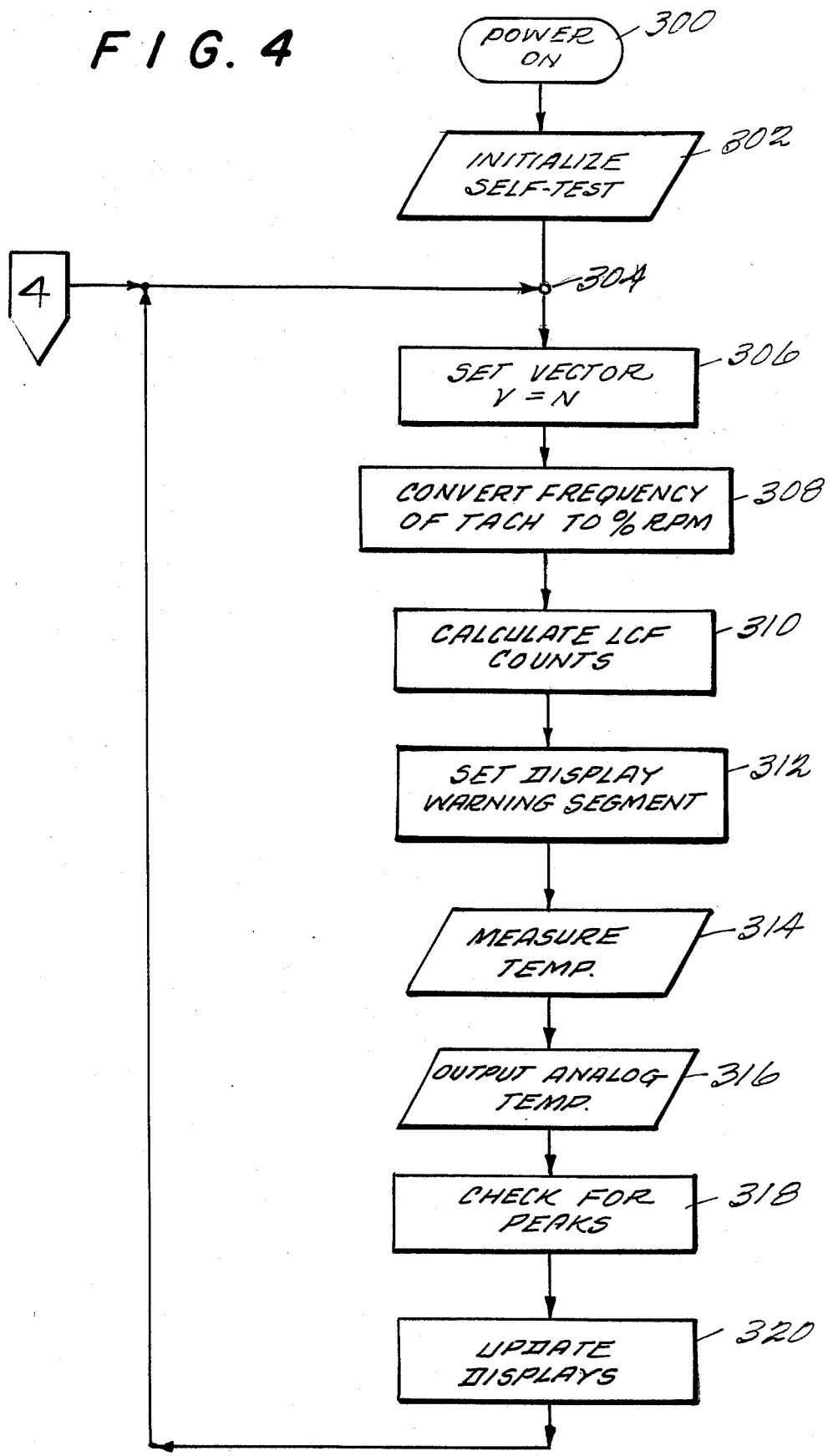
FIG. 4 shows a flow chart of the main loop of the program used according to the present invention.

The structure according to the present invention operates according to flow charts shown in FIGS. 4 thorough 6B. The main operating loop of this flow chart is shown in FIG. 4, and will be discussed in detail herewith.

Upon detecting a power on condition at step 300, the system initializes and self tests at step 302. The main loop begins at point 304. Initially, a "vector" is set to have a value of N at step 300. This vector will be discussed herein, and is used to determine the mode of operation of the system. By setting this vector value equal to N, a normal mode is established. The vector can also assume values of S and C, with S indicating a show mode, and C indicating a calibrate mode.

At step 308, a frequency obtained from tachometer 116 and signal processor 118, is converted into a percentage rpm. This percentage rpm represents a percent of the red line value that the tachometer is currently reading. As has been discussed above, this percent rpm is used for many functions, including to determine whether the engine is in starting or running mode.

At step 310, the LCF counts are calculated. LCF refers to a parameter known in the art as low cycle fatigue. When an aircraft engine goes through cycles of fast and slow rpm, a certain amount of fatigue will be caused to this engine. Based on parameters known to those of ordinary skill in the art, a weighting is placed on engine excursions. This weight is proportional to an amount of stress caused to the engine by these excursions through the cycling in rpm. These excursions are determined by storing a speed history including at least maximum and minimum values over a certain period of time, in memory 154. At step 310, based on this speed history, an LCF count is calculated. This LCF count is a weighting factor, and according to one particular embodiments, is calculated according to the following chart.

| ENGINE CYCLES | RPM EXCURSIONS |
| --- | --- |
| .90 | 28% to 95.8% |
| .54 | 53% to 95.8% |
| .18 | 70% to 95.8% |
| .05 | 80% to 95.8% |

At step 312, the appropriate display warning segment 214 is activated. This display warning segment 214 indicates a warning position, above which the exhaust gas temperature will indicate a fault occurrence. This warning segment will be set at different temperature levels depending on whether the engine is operating or starting. As discussed above, the warning temperature in this embodiment will be set at 888° C. during starting, and 827° C. during running.

At step 314, the temperature is measured, and output as an analog signal on signal line 164 at step 316. Temperature and rpm peaks, are checked for at step 318. Step 318 may also include the step of storing minimum and maximum peaks for use with the LCF calculation of step 310. At step 320, the displays are updated. As discussed above with respect to FIGS. 3A and 3B, a digital display 212 of the temperature is provided in normal mode. Analog display 210 is also normally displayed. The digital temperature display 212 and analog temperature display 210 are both updated during step 320. After step 320, the control flow returns to point 304, to reenter the main loop.

Figure 5A:
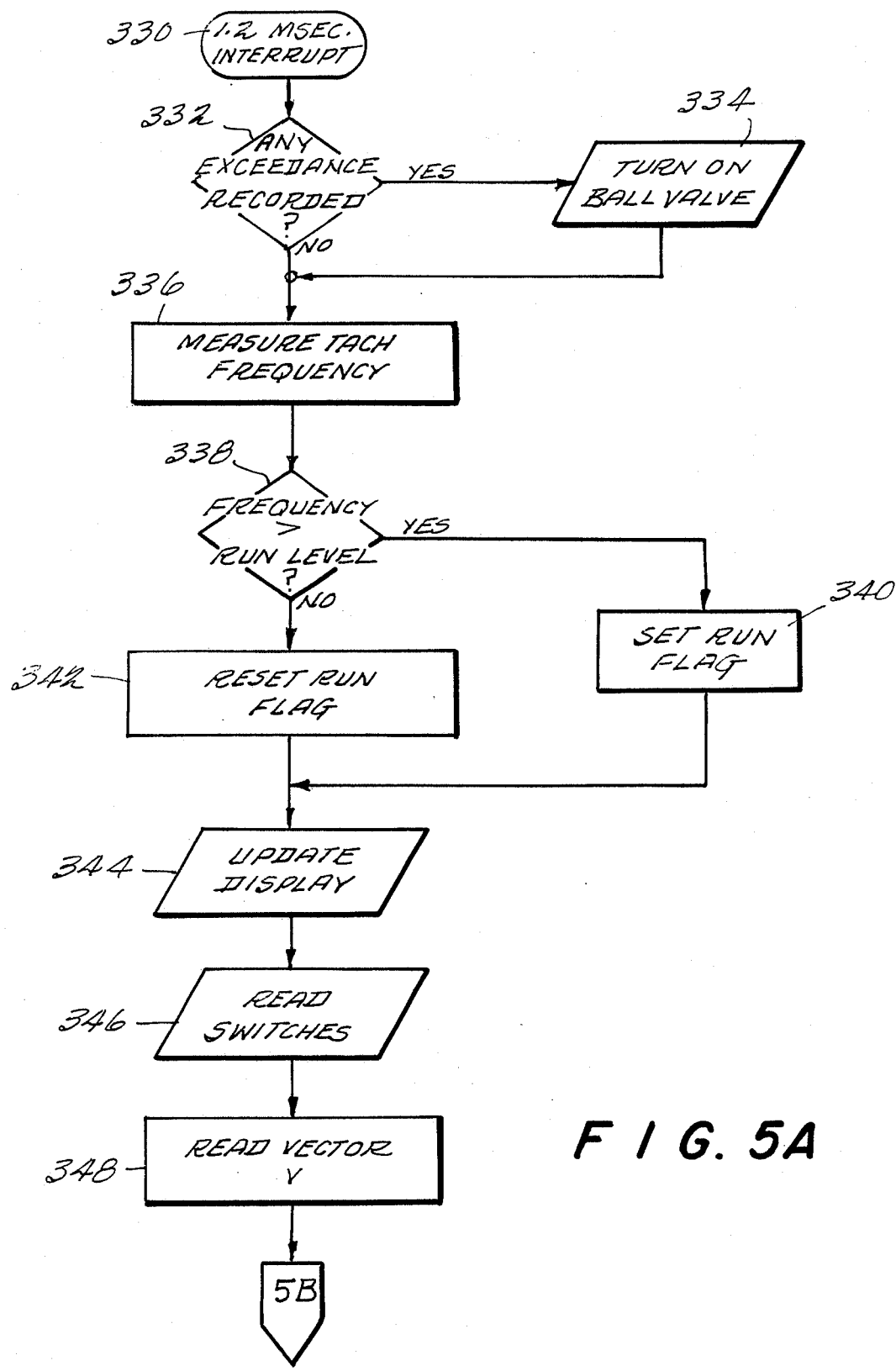
FIGS. 5A and 5B show a flow chart used according to a 1.2 millisecond interrupt that operates many of the features of the present invention.

As can be appreciated from the above, not all functions of the meter are performed in this main loop. FIG. 5A shows one of the operational interrupts according to this embodiment. According to this embodiment, this interrupt occurs every 1.2 milliseconds. This 1.2 millisecond interrupt routine begins at step 330. A decision block occurs at step 332, which determines if any exceedance has been recorded since the previous interrupt. These exceedances include, for instance, starting limits for temperature, operating limits for temperature, and operating speed above a certain limit. According to this embodiment, starting limits which cause an exceedance are (a) temperature greater than 832° for 55 seconds, (b) temperature greater than 838° for 40 seconds, (c) temperature greater than 871° for 7 seconds, and (d) temperature greater than 888° for 3 seconds. Operating limits include (a) temperature greater than 766° for 60 seconds, (b) temperature greater than 788° for 18 seconds, (c) temperature greater than 816° for 6 seconds, or (d) temperature greater than 827° for 3 seconds. The operating speed limit occurs when the rpm is greater than 103%.

If any exceedance is recorded, an electromagnetic ball relay is turned on at step 334. The ball relay is used to show that an exceedance has occurred, and is a magnetic device which, once switched, will remain in its previous state until reset. Accordingly, by turning on the ball relay, an indication that an exceedance has occurred will be provided and maintained until the ball relay is turned off. Accordingly, without consuming any additional power, the exceedance will still be indicated.

At step 336, the tachometer frequency is measured. This is measured by counting the time of one cycle of the tachometer and using this time as representative of the tachometer frequency. It is necessary to count this tachometer frequency within the 1.2 milliseconds of the interrupt, so that tachometer frequency can be obtained before another interrupt stops this counting.

At step 338, a decision is made whether the frequency is greater than the run or operating level. If the frequency is greater than the run level, the run flag is set at step 340, so that the remainder of the apparatus will determine that the aircraft is in an operation mode. If the frequency is not greater than the run level, a starting mode is recognized, and the run flag is reset at step 342.

The display is updated at step 344. All of the information to be displayed on the indicator is stored in a register that is included within memory 154. The contents of this register updates the display at step 344, so that the display is brought current every 1.2 milliseconds. At step 346, the position of switches 130 are read. At step 348, the vector V is read from memory. Flow then passes to FIG. 5B.

Figure 5B:
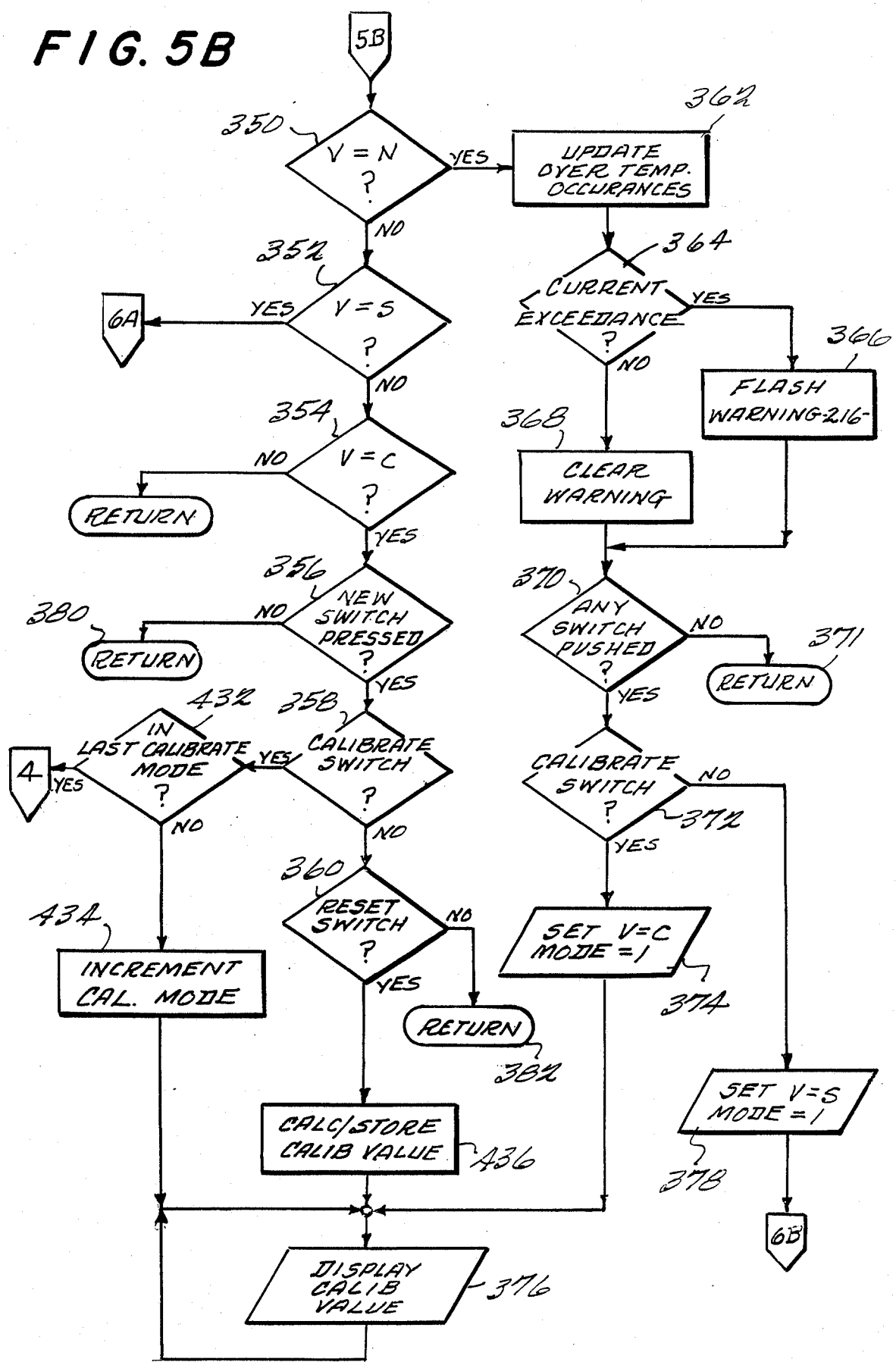

The first three steps in FIG. 5B determine the value of vector V. A comparison of vector V with the value N is made at step 350. A comparison with value S is made at step 352. Finally, a comparison with value C is made at step 354. Based on the results of this comparison, flow selectively passes to different locations. This flow will be discussed later herein. If the results of all of steps 350, 352, and 354 are no—that is that the vector is neither N, S nor C, flow exits the interrupt.

The different flow paths resulting from a positive indication at the steps 350, 352 and 354 will now be discussed.

If the vector V is equal to N, this indicates that the meter is in normal mode. In normal mode, step 362 updates the overtemperature occurrences. At step 364, a test is made to determine if another overtemperature occurrence is currently in progress. If yes, warning segment 216 (see FIG. 3A) is flashed at step 366 to indicate that a current exceedance of temperature limits exists. If there are no current exceedances at step 364, however, any warning which may be on the display is cleared at step 368.

At step 370, a test is made to determine if any switches have been depressed. A negative response to the test of step 370 causes an exit from the interrupt routine at step 371. If any switch has been pressed at step 370, a further test is made at step 372 to determine if the switch 135 pushed is calibration switch 135. If calibration 135 switch has been depressed at step 372, the vector is set to the value C, and a mode value is set to 1 at step 374. This mode value represents the first of the various limits the indicator can monitor. At step 376, the calibration value is displayed until another interrupt occurs.

If calibration switch 135 has not been depressed at step 372, the vector is set to the value S, with the mode again set to value 1 indicating the first of the various limits has been selected. At this time, control also passes to FIG. 6B which will be described later herein.

If the vector is determined not to be N at step 350, a test is made at step 352 to determine if the vector is S. If the vector is S, control passes to location 6A shown in FIG. 6A.

Figure 6B:
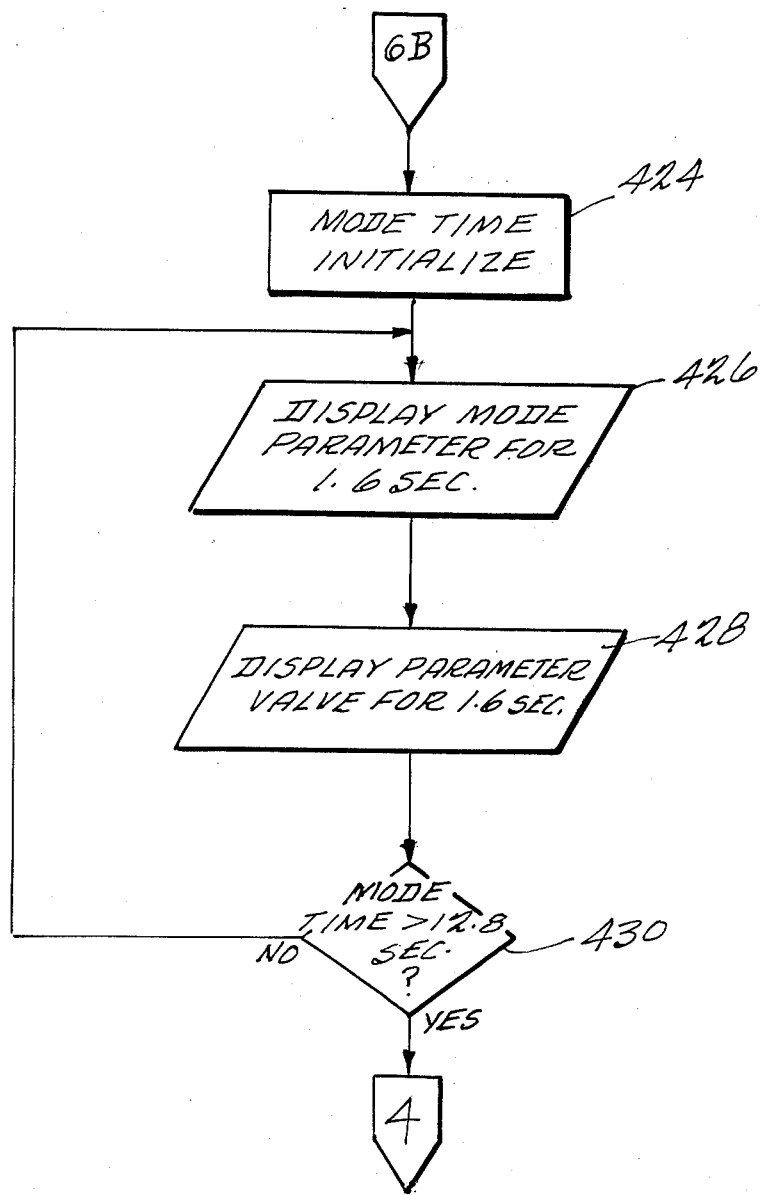
FIGS. 6A and 6B show a branch of the interrupt routine.
Figure 6A:
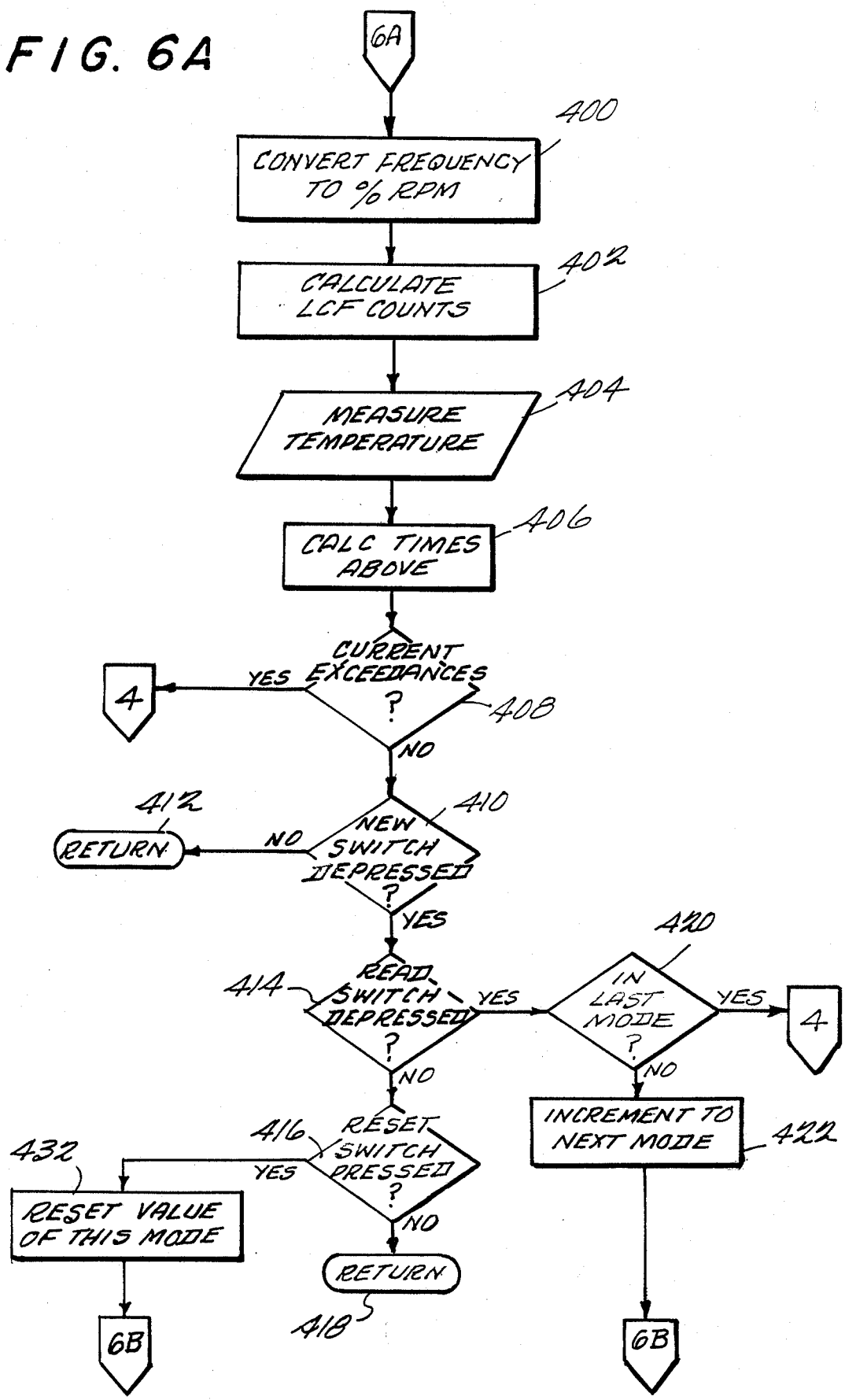

In FIG. 6A, at step 400, the frequency is converted to a percentage rpm. At step 402, the LCF counts are calculated, and at step 404, the temperature is measured. The times above predetermined limits are calculated at step 406. If any current exceedances are detected at step 408, control returns to location 4 in the main loop of FIG. 4. However, if there are no current exceedances detected at step 408, step 410 determines whether any new switch has been pressed. If not, an exit from the subroutine is executed at step 412. However, if a new switch has been pressed at step 410, it is determined at step 414 whether this is read switch 131, and at step 416 whether this is the reset switch 133. If neither of the read nor reset switches have been depressed, a return from the interrupt is executed at step 418.

If read switch 131 has been determined to be the switch pressed, the first test made is whether the device is in the last mode at step 420. This last mode indicates the last of the various limits has been displayed. According to this embodiment, there are 15 separate display modes. After cycling through these 15 display modes, the last mode is detected. If a last mode determination is made, instead of incrementing to the next mode, the meter will return to normal mode upon the next read switch initiation. Accordingly, flow will then pass to location 4 in FIG. 4 of the main loop. If last mode is not determined at step 420, an increment to next mode is carried out at step 422. After step 422, control passes to point 6B in FIG. 6B.

In step 424 of FIG. 6B, the mode time is initialized to monitor the length of time that a particular mode is displayed. After a certain amount of time, the display will return to the normal mode. According to this embodiment, the mode time is 12.8 seconds. After this mode time is initialized, the mode parameter will be displayed for 1.6 seconds at step 426. The display parameter value is subsequently displayed for a subsequent 1.6 seconds at step 428. During this time, interrupts are still occurring, so that other operations besides displaying a value will continue to occur (such as updating display, etc.).

At step 430, a determination whether the mode time is greater than 12.8 seconds is made. If the mode time is greater than 12.8 seconds, control is once again returned to the main loop at location 4 of FIG. 4. However, if mode time is not greater than 12.8 seconds, control again passes to step 426 to continue alternately displaying the parameter and the parameter value.

All of these operations have occurred due to read switch 131 having been pressed at step 414. However, if read switch 131 is not pressed at step 414, it is determined whether reset switch 133 has been pressed at step 416. If so, the value of the particular mode is reset at step 432. Control again then passes to location 6B in FIG. 6B so that the mode parameter and display parameter can be alternately displayed for the allowable time of the mode.

Returning to FIG. 5B, if the vector is determined not to be S at step 352, a further test is made at step 354 to determine if this vector is the vector C. If not, the interrupt is exited, and control again passes to the main loop. However, if the vector equals C, it is tested at step 356 whether a new switch has been pressed. If not, control again exits the interrupt at step 380. Whether calibrate switch 135 has been depressed is again determined at step 358. If not, it is determined whether reset switch 133 has been depressed at step 360, with a negative result exiting the interrupt at step 382. If the calibrate switch has been depressed at step 358, step 432 makes a determination whether the last calibrate mode is currently in progress. If yes, control passes to point 4 in FIG. 4 and again joins the main loop. However, if the last calibrate mode is not detected at step 432, the calibrate mode is incremented at step 434.

If reset switch 133 is determined to have been depressed at step 360, the calibration value is calculated or stored at step 436. Control then passes to step 376 where the calibration value is displayed. If reset switch 133 has not been depressed, the increment calibrate mode has occurred at step 434, and control thereafter passes to step 376 where the calibrate value is displayed. This calibration value is continuously displayed until another interrupt interrupts the operation.

It can therefore be seen that, according to the present invention, an advantageous function is made available by the relatively advanced, yet simple in construction, structure of the present invention. Because both functions of rpm and temperature are obtained by the structure, different temperature limits for start and operate are possible. Furthermore, both the functions of temperature and functions of engine rotational speed can be displayed on this single relatively simple display. The electronics of the display can be mounted in a container having a cross sectional area smaller than the size of the display—but yet sixteen functions can be performed by this structure according to the present invention. Therefore, significant advantages would be obtained when using this structure in the field of aircraft design.

Although only a few exemplary embodiments of this invention have been described in detail above, those skilled in the art will readily appreciate that many modifications are possible in the exemplary embodiments without materially departing from the novel teachings and advantages of this invention. For example, this structure could be used with any type of display, not just a liquid crystal, and modifications in the program are possible which would not affect the inventive concepts thereof.

Accordingly, all such modifications are intended to be included within the scope of this invention as defined in the following claims.

What is claimed is:

1. An indicator assembly for an aircraft that has an engine, said induction assembly comprising:
   selecting means for selecting one of a plurality of information values to be displayed, said plurality of information values including information values indicative of: (a) temperature of said engine, (b) revolution rate of said engine, and (c) temperature of said engine as a function of revolution rate of said engine;
   processing means, coupled to signals indicative of a temperature and a revolution rate of said engine, for determining a current value of said one information value based on at least one of said temperature and said revolution rate of said engine, and producing a display signal indicative thereof; and
   display means for producing a display output based on said display signal.

2. An indicator assembly as in claim 1 wherein said processing means is also for:
   comparing said revolution rate of said engine with a predetermined threshold to determine an operating state of said engine, said operating state being an operating mode when greater than said threshold and an starting mode when less than said threshold,
   determining a temperature reference based on said temperature of said engine and said operating state, and
   computing a temperature relation as a function of said temperature of said engine and said temperature reference and wherein said selecting means can also select said temperature relation to be displayed.

3. An assembly as in claim 1 wherein said processing means is also for:
   comparing said revolution rate of said engine with a predetermined threshold;
   determining which of at least two different temperature limits should be used on said revolution rate; and
   producing a different display signal for each limit, said display signal being displayed on said display means.

4. Assembly as in claim 1 further comprising:
   memory means for storing maximum and minimum revolution rates within a predetermined time period; and
   means for determining a low cycle fatigue value using said maximum and minimum revolution rates.

5. An indicator assembly as in claim 1 wherein said processing means also determines whether said engine of said aircraft is in operate mode or in start-up mode based on said revolution rate of said engine, and wherein said information value (c) is a temperature overlimit value, based on a temperature comparison with a variable limit that varies based on said determination.

6. Assembly as in claim 1 wherein a plurality of different ones of said information values can be sequentially displayed, and wherein said selecting mean sequentially cycles between different ones of said plurality of information values.

7. Assembly as in claim 4 wherein one of said information values is normally being displayed, and said selecting means selects one of said plurality of information values other than said one which is usually being displayed.

8. Assembly as in claim 7 wherein temperature is said value usually being displayed.

9. Apparatus as in claim 7 wherein said information values other than said one which is usually displayed, is displayed for a limited time, after which said one information value which is usually displayed, is again displayed.

10. Assembly as in claim 7 further comprising a ball relay, coupled to said processing means, for indicating a warning condition.

11. Assembly as in claim 7 wherein said display means includes a warning indication area thereon said warning indication driven by said processing means.

12. Assembly as in claim 7 wherein said display means is a single display unit.

13. Assembly as in claim 7 further comprising a chassis in which said processing means and said selecting means are mounted, said chassis being of a cross sectional area smaller than an area size of said display means.

14. Assembly as in claim 7 wherein said processing means is also for causing a flashing display between a title indicative of an information value, and a number indicative of a value of said information value, when an information value other said usually displayed information value is selected.

15. Assembly as in claim 14 further comprising a plurality of buffers for receiving input signals to be connected to said processing means.

16. Assembly as in claim 15 further comprising:
   means for obtaining a measurement of a temperature of said engine and producing a temperature output indicative thereof; and
   means for obtaining a measurement of a revolution rate of said engine and producing a revolution output indicative thereof.

17. An indicator assembly for an aircraft with an engine, said indicator assembly comprising:
   processing means for:
   (a) receiving signals indicative of a temperature of said engine and a revolution rate of said engine,
   (b) comparing said revolution rate with a predetermined threshold of revolution rate to determine an operating state of said engine, said operating state being an operating mode when greater than said threshold, and a starting mode when less than said threshold, (c) determining a temperature reference based on said operating state, and (d) computing a temperature relation as a function of said temperature reference and said temperature of said engine; and means for displaying said temperature relation.

18. An assembly as in claim 17, further comprising mode selecting means for selecting one of a plurality of information values, to be displayed.

19. Apparatus as in claim 18 wherein one information value is usually displayed, and other information values, including said temperature relation, are selected by an operation of said mode selecting means.

20. Apparatus as in claim 19 said usually displayed information value is temperature of said engine.

21. Apparatus as in claim 19 wherein there are a plurality of information values, and said mode setting means switches between said plurality of information values by choosing a next information value in a serial order.

22. Apparatus as in claim 19 further comprising a chassis housing said processing means, therein said chassis has a smaller cross-sectional area than an area of said displaying means.

23. An indicator assembly for an aircraft engine, comprising:

a display information value to be means for selecting a particular information displayed from a plurality of information values, said plurality of information values including values indicative of: (a) temperature, (b) revolution rate and (c) functions of temperature as compared with a reference that is based on revolution rate;

processing means for:

(a) receiving signals indicative of temperature and revolution rate of said engine, (b) normally displaying a temperature of said engine on said displaying means, (c) detecting a selection by said select (d) obtaining a value indicative of said particular information value, only for a predetermined time after said c) detecting a selecting function, and (e) displaying said value only during said predetermined time while it is being obtained, said displaying being on a same display area that said temperature is normally displayed on; and a chassis for mounting said selecting means and said processing means, said chassis having a cross-sectional area smaller than an area of said display.

24. Apparatus as in claim 23 wherein said processing means is also for f) flashing between a label indicative of said information to be displayed, and a value of said information to be displayed.

25. Apparatus as in claim 23 wherein said display is a single display.

26. An indication assembly for an aircraft engine, comprising:

display;

a means for selecting a particular information value to be displayed on said display from a plurality of information values, said plurality of information values including:

(a) a condition during starting mode where temperature is greater than a first threshold, (b) a condition during operation mode where temperature is greater than a second threshold, (c) revolution rate greater than a danger revolution rate times a proportionality constant, (d) peak temperature value during start mode, (e) time above certain temperature during start operation, (f) peak temperature during operating mode, (g) time above certain temperature during operating mode, (h) engine speed peak, (i) time above a red line value of revolution rate times a proportionality constant, (j) engine operating hours in operating mode, and (k) engine cycles;

processing means for:

(a) receiving signals indicative of temperature and revolution rate of said engine;

(b) normally displaying a temperature of said engine;

(c) detecting a selection by said selecting means;

(d) incrementing a pointer each time a selecting by said selecting means is detected, said pointer indicative of which of said plurality of information values is selected;

(e) obtaining a value indicated by a value of said pointer, said obtaining occurring only for a predetermined time period after said detecting a selecting function;

(f) displaying on said display said information value indicated by said pointer, alternately with a label indicative of said information value, flashing between said label and said value occurring at predetermined intervals, said displaying occurring only during said predetermined time period after said detecting a selection function; and (g) returning to said display of a temperature of said engine and resetting said pointer after said predetermined time period elapses, unless another selection is detected; and a chassis attached to said display and housing said selecting means and said processing means, said chassis having a cross sectional area of a size smaller than an area of said display.

27. A method for indicating a plurality of information values on a display, in an aircraft that has a engine, comprising the steps of:

selecting one of a plurality of information values to be displayed, said plurality of information values including information values indicative of: (a) temperature of said engine, (b) revolution rate of said engine, and (c) temperature receiving signals indicative of a temperature and a revolution rate of said engine;

determining a current value of said one information value based on at least one of temperature and revolution rate of said engine;

producing a display signal indicative thereof; and displaying a display output based on said display signal.

28. A method as in claim 27 comprising the further steps of:

comparing said revolution rate of said engine with a predetermined threshold, to determine an operating state of said engine as being in an operating mode when greater than said threshold and in a starting mode when less than said threshold, determining a temperature reference based on said operating state, and computing a temperature relation as a function of said temperature of said engine and said temperature reference.

29. A method as in claim 27 comprising the further steps of:
   storing maximum and minimum revolution rates within a predetermined time period; and
   determining a low cycle fatigue value based on said maximum and minimum values.

30. A method as in claim 27 comprising the further step of determining whether said engine of said aircraft is in operate mode or in start-up mode based on said revolution rate of said engine, and computing said information value (c) as a temperature overlimit value, based on a temperature comparison with a variable limit that varies based on said determination.

31. A method as in claim 30 comprising the further steps of:
   comparing said revolution rate of said engine with a predetermined threshold;
   determining which of at least two different temperature limits should be used, based on a result of said comparing; and
   producing a different display signal for each limit, said output being displayed on a display means.

32. A method as in claim 30 comprising the further steps of sequentially displaying different ones of said information values, and sequentially cycling between different ones of said plurality of information values for each selecting.

33. A method as in claim 32 comprising the further step of causing a flashing display between a title indicative of an information value, and a number indicative of a value of said information value, when an information value other said usually displayed information value is selected.

34. A method as in claim 32 further comprising the step of calibrating said meter.

35. A method as in claim 32 wherein one of said information values is normally being displayed, comprising the further steps of selecting one of said plurality of information values other than said one which is usually being displayed.

36. A method as in claim 35 wherein temperature of the engine is the value usually being displayed.

37. A method as in claim 36 wherein said information values other than said one which is usually displayed, are only displayed for a limited time, after which said one information value which is usually displayed, is again displayed.

38. A method for indicating information values on a display associated with an engine, comprising the steps of:
   receiving signals indicative of a temperature of said engine and a revolution rate of said engine;
   comparing said revolution rate with a predetermined threshold of revolution rate to determine an operating state of said engine as being in an operating mode when greater than said threshold, and in a starting mode when less than said threshold;
   determining a temperature referenced based on said operating state;
   computing a temperature relation as function of said temperature reference and said temperature of said engine; and
   displaying said temperature relation.

39. A method as in claim 38 comprising the further steps of selecting an information value from a plurality of information values, to be displayed.

40. A method as in claim 39 wherein one information value is usually displayed, and other information values are selected in said selecting step.

41. A method as in claim 40 wherein said usually displayed information value is temperature of the engine.

42. An method of indicating information on a display associated with an aircraft engine, comprising the steps of:
   selecting a particular information value to be displayed from a plurality of information values, said plurality of information values including values indicative of: (a) temperature, (b) revolution rate and (c) functions of temperature as compared with a reference that is based on revolution rate;
   receiving signals indicative of temperature and revolution rate of said engine;
   normally displaying a temperature of said engine;
   detecting a selecting in said selecting step;
   obtaining a value indicative of said particular information value, only for a predetermined time after said detecting a selection step; and 43. A method as in claim 42 comprising the further step of determining whether said engine of said aircraft is in operate mode or in start-up mode based on said revolution rate of said engine, and computing said information value (c) as a temperature overlimit value, based on a temperature comparison with a variable limit based that varies on said determination.

* * * * *

UNITED STATES PATENT AND TRADEMARK OFFICE
CERTIFICATE OF CORRECTION

PATENT NO. : 4,821,216

DATED : April 11, 1989

INVENTOR(S) : John S. Howell, Robert L. Hartung

It is certified that error appears in the above-identified patent and that said Letters Patent is hereby corrected as shown below:

Column 9, Claim 1, line 27, delete "induction" and insert --indicator-- therefor.

Column 9, Claim 3, line 63, after "used", insert --based--.

Column 10, Claim 9, line 26, delete "Apparatus" and insert --Assembly-- therefor.

Column 11, Claim 23, line 29, delete "information value to be";

line 30, after "information", insert --value to be--;

line 40, delete "displaying means", and insert --display-- therefor;

line 41, after "said", delete "select" and insert --selecting means-- therefor;

Column 11, Claim 26, line 60, before "display", insert --a--;

line 61, delete "a".

UNITED STATES PATENT AND TRADEMARK OFFICE
CERTIFICATE OF CORRECTION

PATENT NO. : 4,821,216

DATED : April 11, 1989

INVENTOR(S) : John S. Howell, Robert L. Hartung

It is certified that error appears in the above-identified patent and that said Letters Patent is hereby corrected as shown below:

Column 12, Claim 27, line 48, after "temperature", insert --of said engine as a function of revolution rate of said engine;--.

Column 14, Claim 42, line 41, after "and", insert --displaying said value only while it is being obtained, said displaying being on a same display area that said temperature is normally displayed on.--

Signed and Sealed this

Second Day of November, 1993

Attest:

BRUCE LEHMAN

Attesting Officer

Commissioner of Patents and Trademarks